United States Patent
Kupper et al.

(10) Patent No.: US 8,454,715 B2
(45) Date of Patent: Jun. 4, 2013

(54) DEVICE AND A METHOD FOR CARRYING OUT CHEMICAL AND/OR PHYSICAL REACTIONS BETWEEN A SOLID MATERIAL AND A GAS AS WELL AS A PLANT FOR CEMENT MANUFACTURE

(75) Inventors: Detlev Kupper, Telgte (DE); Luis Lagar Garcia, Oviedo (ES); Andreas Hoppe, Lippstadt (DE); Heinz-Werner Thiemeyer, Ennigerloh (DE); Verena Georg, Hamm (DE); Marco Völlink, Münster (DE)

(73) Assignee: Polysius AG, Beckum (DE)

( * ) Notice: Subject to any disclaimer, the term of this patent is extended or adjusted under 35 U.S.C. 154(b) by 469 days.

(21) Appl. No.: 12/672,530

(22) PCT Filed: Jun. 25, 2008

(86) PCT No.: PCT/EP2008/058100
§ 371 (c)(1),
(2), (4) Date: Jul. 13, 2010

(87) PCT Pub. No.: WO2009/019070
PCT Pub. Date: Feb. 12, 2009

(65) Prior Publication Data
US 2011/0293487 A1 Dec. 1, 2011

(30) Foreign Application Priority Data
Aug. 7, 2007 (DE) .......................... 10 2007 037 281

(51) Int. Cl.
*B01D 45/12* (2006.01)

(52) U.S. Cl.
USPC .................. 55/345; 55/392; 55/399; 55/447; 55/459.1; 55/349; 422/187; 422/255

(58) Field of Classification Search
USPC . 55/345, 392, 399, 447, 459.1, 349; 422/187, 422/255
See application file for complete search history.

(56) References Cited

U.S. PATENT DOCUMENTS
4,318,692 A    3/1982   Hess

FOREIGN PATENT DOCUMENTS
DE            10309575 A1    9/2004

*Primary Examiner* — Jason M Greene
*Assistant Examiner* — Dung H Bui
(74) *Attorney, Agent, or Firm* — Gifford, Krass, Sprinkle, Anderson & Citkowski, P.C.

(57) ABSTRACT

The device according to the invention for carrying out chemical and/or physical reactions between a solid material and a gas, in particular for the preheating, cooling and/or calcining of fine-grain materials, essentially comprises at least one helical and/or spiral conduit, in which the gas-solid material suspension is separated by centrifugal forces into a solid material flow and a gas flow, and, connected to the end of the helical and/or spiral conduit, at least one separation region, to which a solid material conduit for discharging the solid material flow and a gas conduit for discharging the gas flow are connected. The separation region is here formed by a lower part of the gas conduit, the separation region in the region of the junction of the helical and/or spiral conduit and the part of the gas conduit above and adjoining it having the same diameter. To form a swirling flow, the helical and/or spiral conduit opens out tangentially and at an angle to the horizontal of at least 30° into the separation region.

12 Claims, 4 Drawing Sheets

Figure 1:
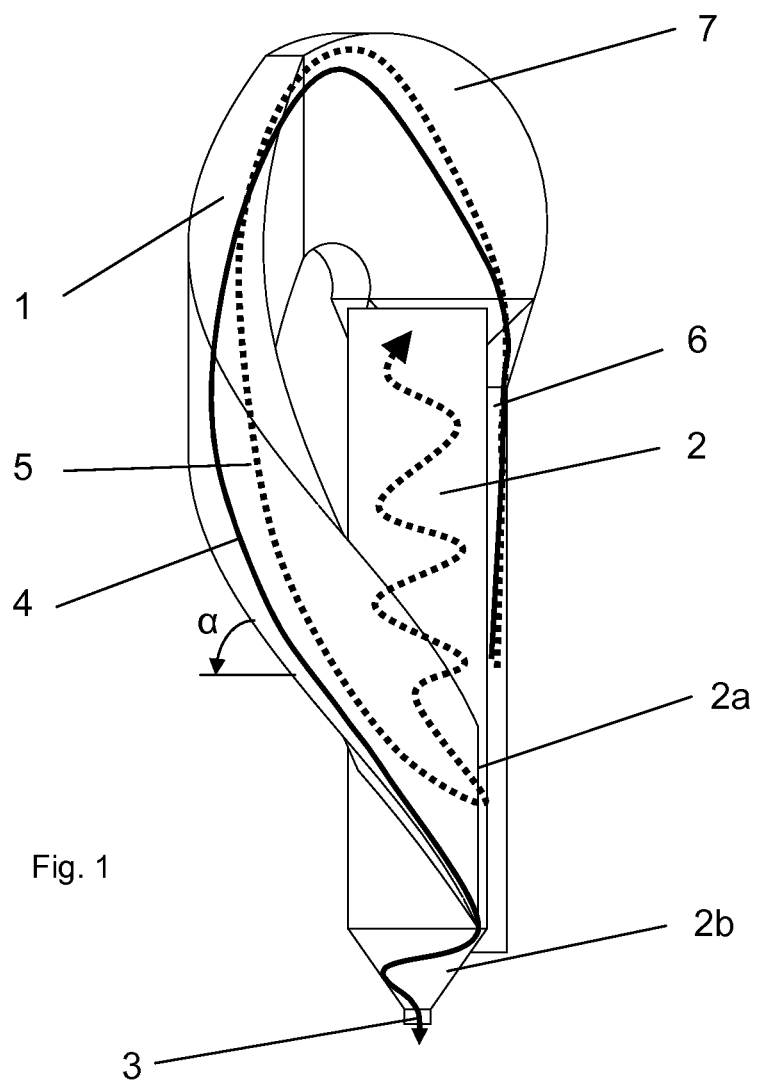

DEVICE AND A METHOD FOR CARRYING OUT CHEMICAL AND/OR PHYSICAL REACTIONS BETWEEN A SOLID MATERIAL AND A GAS AS WELL AS A PLANT FOR CEMENT MANUFACTURE

The invention relates to a device and to a method for carrying out chemical and/or physical reactions between a solid material and a gas, in particular for the preheating, cooling and/or calcining of fine-grain materials as well as a plant for cement manufacture.

From practice, for the preheating, cooling and calcining of fine-grain materials there are known, in particular, systems comprising DC heat exchangers and cyclone separators. Mostly, such devices comprise several stacked stages, the gas flow being directed from the bottom to the top through all stages, whilst the solid material is supplied to the individual stages in the opposite direction.

The drawback of such systems is that they required enormous headroom and the degree of separation of the cyclone separator is not always satisfactory. For instance, uncontrolled flows often occur in the cyclones, which are caused, for example at the cyclone intake, by superimposition of the incoming gas flow on the swirling stream formed in the cyclone, or by reversal of the gas flow direction in the cone of the cyclone. Furthermore, the particles already deposited at the cyclone edge may be reintroduced into the incoming gas flow of the cyclone.

Another problem is that with constructions of different size the centrifugal forces change with the same entry speeds, thus resulting in different separation conditions.

In U.S. Pat. No. 4,318,692 a multistage preheater for cement raw material was therefore proposed, the individual stages of which each consist of an ascending conduit and an adjoining helical and/or spiral conduit. The helical and/or spiral conduit has a rectangular cross-section and is connected to one side face of a block-form collection chamber. The connection point extends here over the whole side face of the block-form collection chamber. The lower part of the collection chamber tapers in the manner of a funnel and serves to discharge the solid material whilst the gas is lead off upwards. The separation degree of this collection chamber is unsatisfactory however.

DE 103 09 575 A1 discloses a cyclotron for the separation of particles from a gas-particle mixture, which has an obliquely entering suction channel. The particles are discharged downwards whilst the gas is lead off via an immersion conduit opening out into the cyclotron.

The invention addresses the problem of improving the degree of separation in the separation chamber.

According to the invention, that problem is solved by the features of the present invention.

The device according to the invention for carrying out chemical and/or physical reactions between a solid material and a gas, in particular for preheating, cooling and/or calcining of fine-grain materials, substantially comprises at least one helical and/or spiral conduit, in which a gas-solid material suspension is separated by centrifugal forces into a solid material flow and a gas flow and, connected to the end of the helical and/or spiral conduit, at least one separation region, to which a solid material conduit for discharging the solid material flow and a gas conduit for discharging the gas flow are connected. The separation region is here formed by a lower part of the gas conduit, the separation region in the region of the junction of the helical and/or spiral conduit and the part of the gas conduit above and adjoining it having the same diameter. To form a swirling flow, the helical and/or spiral conduit opens out tangentially at an angle to the horizontal of at least 30° into the separation region.

A helical and/or spiral conduit in terms of the invention is understood to mean a conduit that is of helical and/or spiral form at least in sections. The twist of the helical and/or spiral conduit can here extend in particular also only over a relatively small angular range of, for example, 90°.

The essential difference compared with solutions known until now is that the helical and/or spiral conduit is not followed by a cyclone-like separator, but only by a gas conduit with an attached solid material conduit. The way in which the helical and/or spiral conduit is connected to the gas conduit feeds the solid material previously separated from the gas flow directly to the solid material conduit and also transforms the gas flow into a swirling flow. This prevents material from being taken up by the gas flow again and being discharged.

The trials forming the basis of the invention have shown that by generating this swirling flow it is possible to separate the solid material flow and the gas flow with great efficiency. In doing so, in particular 70-100% of the material can be separated from the gas-solid material suspension.

In the method according to the invention, the gas-solid material suspension is introduced into the gas conduit via the helical and/or spiral conduit in such a way that a swirling flow is generated in the gas conduit and the solid material is discharged directly downwards.

According to the invention, the helical and/or spiral conduit opens out tangentially into the subsequent gas conduit to generate the swirling flow. 'Tangential' is understood to mean, of course, also those connections of the helical and/or spiral conduit that are approximately tangentially oriented.

According to a preferred embodiment of the invention, the gas conduit is of round construction to facilitate the swirling flow. Furthermore, it is advantageous for the helical and/or spiral conduit to be attached to the gas conduit at an angle to the horizontal between 30 and 60°. In this way, the solid material is guided directly downwards to the solid material conduit whilst the gas flow can be discharged upwards.

To assist the generation of the swirling flow, viewed in the horizontal direction the width of the helical and/or spiral conduit in the region of the connection to the separation chamber is smaller than the width of the separation chamber and preferably smaller than 50% of the width of the separation chamber.

According to a preferred embodiment, the lower part of the gas conduit is constructed to taper in the form of a funnel, the solid material conduit being connected to the part of the gas conduit tapering in the form of a funnel.

The continuation of the gas conduit can have a relatively small or a relatively large diameter in the flow direction of the gas. In this way, method-specific parameters, such as pressure loss or degree of separation, can be influenced and optimised.

In practice, the device is expediently in the form of a multi-stage and/or multi-string arrangement having several helical and/or spiral conduits and associated gas conduits. At the same time, in particular a gas-solid material suspension conduit can be provided, which comprises an ascending conduit and a descending helical and/or spiral conduit, which are connected with one another via a diverter head.

With a multi-stage arrangement, a plurality of stages stacked one above the other are provided, each stage comprising the following components:

a. a gas-solid material suspension conduit for conducting a gas-solid material suspension with a helical and/or spiral conduit, b. a separation region, c. a solid material conduit for discharging the separated solid material, d. and a gas conduit for discharging the separated gas, the gas conduit of one stage merging into the gas-solid material suspension conduit of the next higher stage and the solid material conduit of one stage opening out into the gas-solid material suspension conduit of the next lower stage.

Figure 3:
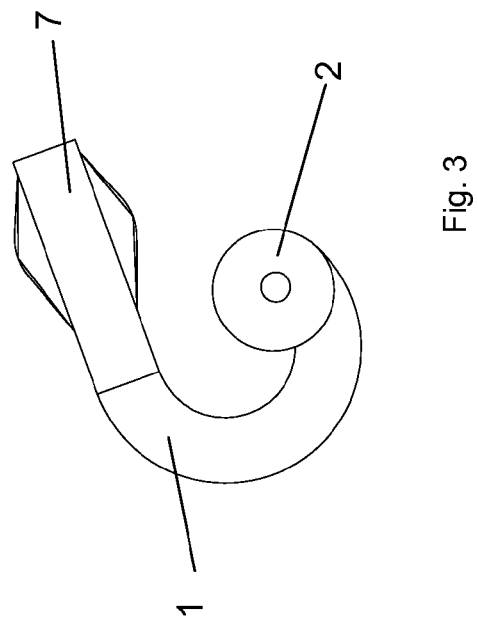
Figure 2:
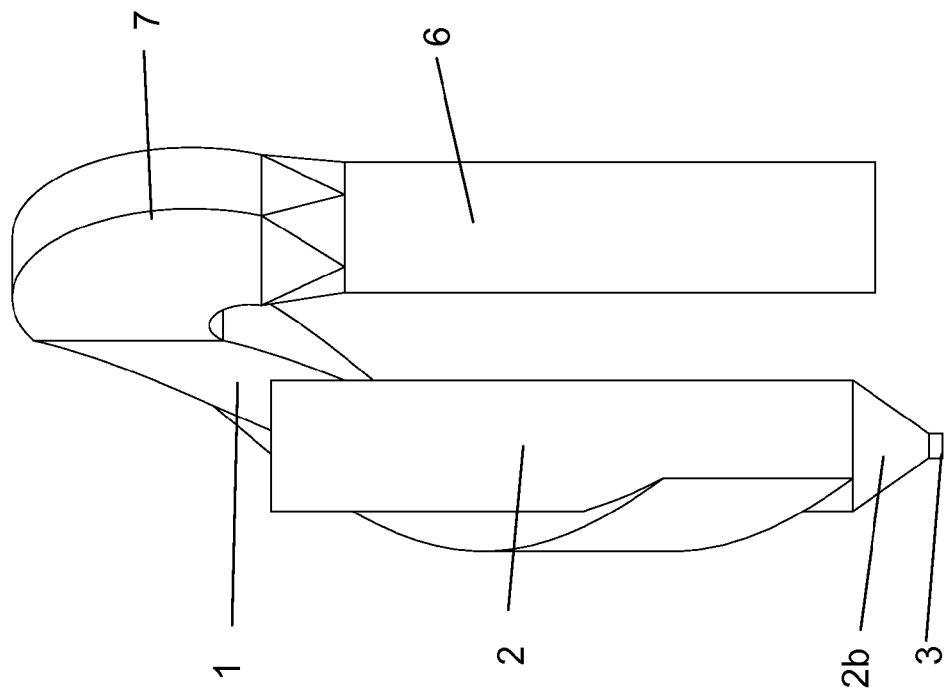
Figure 5:
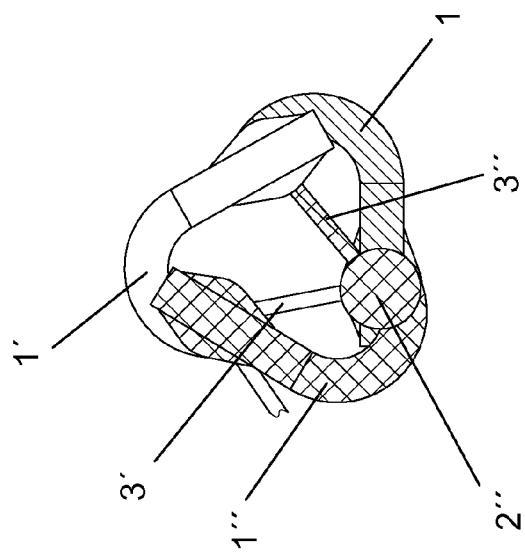
Figure 4:
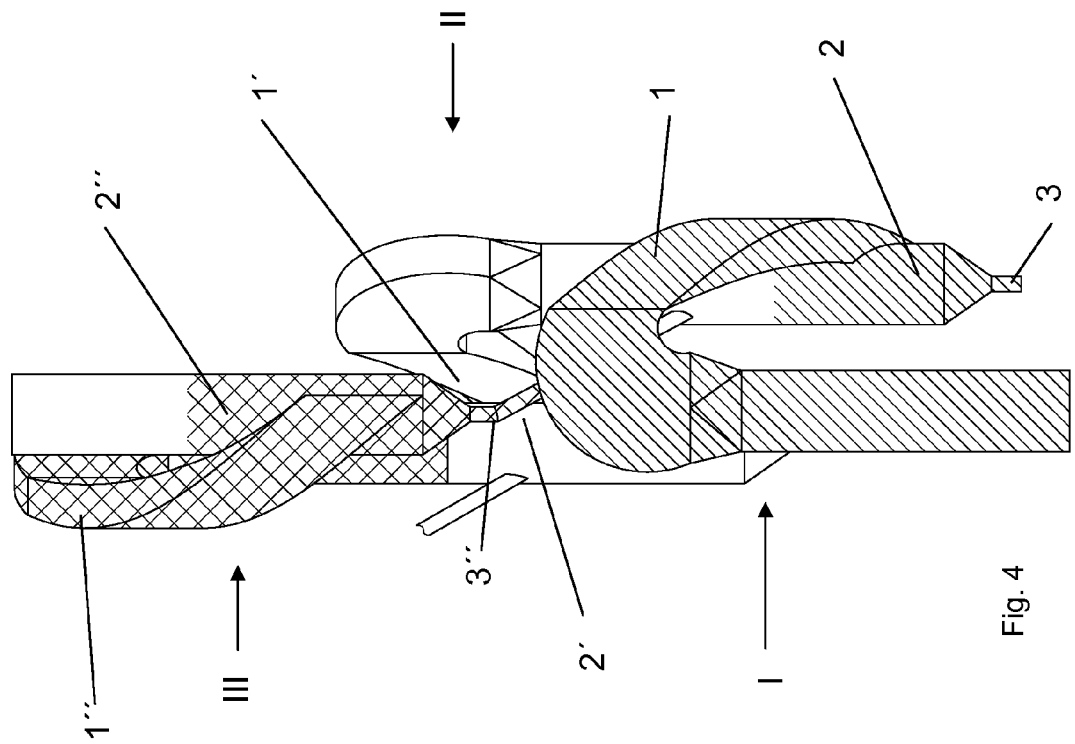
Figure 6:
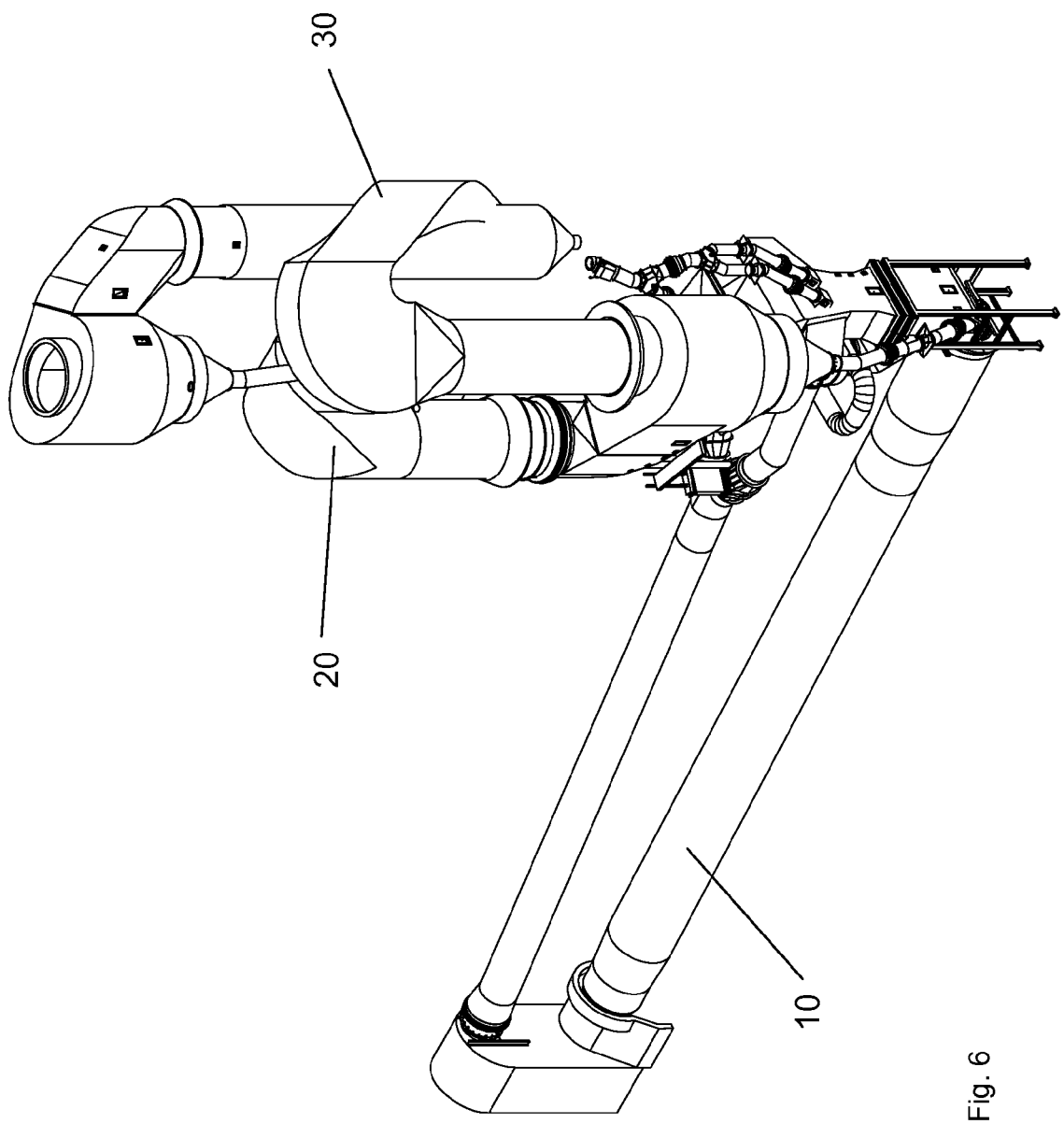

Further advantages and embodiments of the invention are explained in detail hereafter by means of the description and the drawings, in which:

FIG. 1 shows a front view of the device with a helical and/or a spiral conduit and gas conduit, FIG. 2 shows a view of the device according to FIG. 1 rotated through 90°, FIG. 3 shows a plan view of the device according to FIG. 1, FIG. 4 shows a side view of a multi-stage arrangement, and FIG. 5 shows a plan view of the multi-stage arrangement according to FIG. 4 and FIG. 6 shows a three-dimensional representation of a plant for cement manufacture.

The device illustrated in FIG. 1 to FIG. 3 for carrying out chemical and/or physical reactions between a solid material 4 and a gas 5, in particular for preheating, cooling and/or calcining fine-grain materials, consists substantially of at least one helical and/or spiral conduit 1, connected to the end of the helical and/or spiral conduit at least one gas conduit 2 for discharging the gas flow, as well as a solid material conduit 3 for discharging the solid material and connected to the gas conduit.

The lower part of the conduit 2, into which the helical and/or spiral conduit 1 opens, forms a separation region 2a, this separation region and the part of the gas conduit 2 above and adjoining it having the same diameter. The helical and/or spiral conduit 1 opens tangentially and an angle α to the horizontal of at least 30° into the separation region 2a. The angle α is preferably in the range between 30° and 60°.

The gas conduit 2 or rather the separation region 2a of the gas conduit 2 further has in its lower region a part 2b tapering in the form of a funnel, to which the solid material conduit 3 is connected. The part 2b tapering in the form of a funnel adjoins the helical and/or spiral conduit 1 immediately below their junction. Within the scope of the invention it is also possible for a small distance to be provided between the bottom end of the junction of the helical and/or spiral conduit 1 and the part 2b tapering in the form of a funnel, but this should be less than the radius, preferably less than half the radius, of the gas conduit 2 in the region of the junction.

To carry out chemical and/physical reactions between a solid material and a gas, the gas-solid material suspension is admitted to the gas conduit 2 via the helical and/or spiral conduit 1. As this happens, centrifugal forces in the helical and/or spiral conduit 1 cause a pre-separation of the gas-solid material suspension into the solid material flow 4 and the gas flow 5.

By the manner in which the helical and/or spiral conduit is connected to the gas conduit, the solid material flow 4 previously separated from the gas flow is guided directly via the part 2b tapering in the form of a funnel to the solid material conduit 3. The gas flow 5 is additionally transformed into a swirling flow and discharged upwards via the gas conduit 2. This prevents material from being taken up by the gas flow again and being carried away.

The obliquely downwardly directed material feed into the gas conduit also prevents the swirling flow created in the gas conduit from being superimposed on the material flow in the region of the opening of the helical and/or spiral conduit 1. In the trials on which the invention is based, it was shown that by generating this swirling flow the solid material flow and the gas flow can be separated with great efficiency.

According to a further embodiment of the invention, the cross-section of the gas conduit 2 in the region of the junction is 0.5 to 1.5 times as large as the cross-section of the helical and/or spiral conduit 1. This cross-section ratio assists the development of the swirling flow.

For certain applications of the device, for example, as a device for heat-treating fine-grain material, a gas-solid material suspension conduit can be provided, as in the exemplary embodiment illustrated, which comprises an ascending conduit 6 and the descending helical and/or spiral conduit 1, a diverter head 7 also being provided, which connects the ascending conduit 6 to the helical and/or spiral conduit 1. The ascending and descending branches of the gas-solid material suspension conduit ensure an adequate contact time between gas and solid material. On the other hand, this construction enables a very compact configuration of comparatively low overall height to be achieved.

Within the scope of the invention it is possible for the radius and/or the inclination and/or the cross-sectional shape and/or the cross-sectional dimension of the helical and/or spiral conduit 1 to change in the direction of flow of the gas-solid material suspension. In this way, on the one hand the pre-separation of the gas-solid material suspension in the region of the helical and/or spiral conduit can be influenced and on the other hand the helical and/or spiral conduit 1 can be adapted to external conditions. This is especially advantageous when several stages are nested in one another and arranged above one another.

The radius, inclination, cross-sectional shape and/or the cross-sectional dimension can vary abruptly in the direction of flow and/or at least in one section also continuously. Thus, for example, a reduction in radius causes an increase in the centrifugal force, whereas an increase in radius corresponds to a reduction in centrifugal force. By changing the cross-sectional shape and dimension, the flow speed can be influenced.

Normally, the above-described device will be in the form of a multi-stage and/or multi-string arrangement having a plurality of helical and/or spiral conduits and associated gas conduits. A three-stage arrangement is illustrated schematically in FIG. 4 and FIG. 5. This arrangement comprises, in particular, a lower stage I, a middle stage II and an upper stage III, in each case the gas conduit 2 of a lower stage merging into the helical and/or spiral conduit 1 of a stage arranged above. The gas conduit 2" of the uppermost stage III is, for example for removal of dust, connected to a filter or to a downstream high-efficiency separator. In the case of the solid material conduit 3, the circumstances are reversed. Accordingly, the solid material conduit 3" of the uppermost stage III is connected to the gas conduit 2 leading to the helical and/or spiral conduit 1' of the middle stage II, whereas the solid material conduit of the middle stage II is connected to the gas conduit leading to the helical and/or spiral conduit 1 of the lower stage I. The solid material conduit 3 of the lowermost stage I is connected to a subsequent assembly, for example, a calciner or a rotary kiln. In this way, a solid material introduced into the gas conduit leading to the helical and/or spiral conduit 1" of the uppermost stage III can be heat-treated in a hot gas flow.

As is especially apparent from FIG. 4 and FIG. 5, the individual stages of the multi-stage arrangement can be arranged nested in one another by virtue of the helical and/or spiral conduits, so that an overall arrangement that is very compact in the vertical direction is produced.

FIG. 6 finally shows a three-dimensional representation of a plant for heat-treating fine-grain material during cement manufacture, having a rotary kiln 10, a calciner 20 and a preheater 30. The calciner 20 and/or the preheater 30 can here be constructed according to the device described in FIGS. 1 to 5.

The invention claimed is:

1. A device for carrying out chemical or physical reactions between a solid material and a gas, in particular for the preheating, cooling or calcining of fine-grain materials, having
   at least one helical or spiral conduit (1), in which a gas-solid material suspension is separated by centrifugal forces into a solid material flow (4) and a gas flow (5) and,
   connected to the end of the helical or spiral conduit (1), at least one separation region (2a), to which a solid material conduit (3) for discharging the solid material flow (4) and a gas conduit (2) for discharging the gas flow (5) are connected,
   characterised in that the separation region is formed by a lower part of the gas conduit (2), the separation region (2a) in a region of a junction of the helical or spiral conduit (1) and the part of the gas conduit (2) above and adjoining it have the same diameter and, to form a swirling flow, the helical or spiral conduit (1) opens out tangentially and at an angle ($\alpha$) to horizontal of at least 30° into the separation region (2a).

2. A device according to claim 1, characterised in that the helical or spiral conduit (1) is connected to the gas conduit (2) at an angle to horizontal of between 30° and 60°.

3. A device according to claim 1, characterised in that, viewed in a horizontal direction, a width of the helical or spiral conduit (1) in a region of the connection to the gas conduit (2) is smaller than a width of the gas conduit (2) and preferably smaller than 50% of the width of the gas conduit (2).

4. A device according to claim 1, characterised in that a cross-section of the gas conduit (2) in the region of the junction is 0.5 to 1.5 times as large as a cross-section of the helical or spiral conduit (1).

5. A device according to claim 1, characterised in that the solid material conduit (3) is connected below the separation region (2a).

6. A device according to claim 1, characterised in that the lower part (2b) of the gas conduit (2) is constructed to taper in a form of a funnel.

7. A device according to claim 6, characterised in that the solid material conduit is connected to the part (2b) of the gas conduit (2) tapering in the form of a funnel.

8. A device according to claim 6, characterised in that a distance between a bottom part of the junction of the helical or spiral conduit (1) and the part (2b) tapering in the form of a funnel is less than a radius, preferably less than half the radius, of the gas conduit (2) in the region of the junction.

9. A device according to claim 6, characterised in that the part (2b) tapering in the form of a funnel adjoins the helical or spiral conduit (1) immediately below the junction.

10. A device according to claim 1, characterised in that the device is in a multi-stage or a multi-string arrangement having several helical or spiral conduits (1) and associated gas conduits (2) arranged one above another or in parallel.

11. A device according to claim 1, characterised in that a gas-solid material suspension conduit is provided, which comprises an ascending conduit (6) and a descending helical or spiral conduit (1), and a diverter head (7), which connects the ascending conduit (6) with the descending helical or spiral conduit (1).

12. A device according to claim 11, characterised in that a plurality of stages (I, II, III) stacked one above another are provided, each stage comprising the following components:
   a. a gas-solid material suspension conduit for conducting a gas-solid material suspension,
   b. a separation region (2a),
   c. a solid material conduit (3) for discharging the separated solid material,
   d. and a gas conduit (2) for discharging the separated gas, the gas conduit (2) of one stage merging into the gas-solid material suspension conduit of the next higher stage and the solid material conduit (3) of one stage opening out into the gas-solid material suspension conduit of the next lower stage.

* * * * *

UNITED STATES PATENT AND TRADEMARK OFFICE
CERTIFICATE OF CORRECTION

PATENT NO. : 8,454,715 B2  
APPLICATION NO. : 12/672530  
DATED : June 4, 2013  
INVENTOR(S) : Detlev Kupper et al.

Page 1 of 1

It is certified that error appears in the above-identified patent and that said Letters Patent is hereby corrected as shown below:

On the Title Page, Item (30)

The Foreign Application Priority Data incorrectly lists the priority as DE 10 2007 037 281 and it should be DE 10 2007 037 281.9.

Signed and Sealed this  
Twenty-fourth Day of June, 2014

Michelle K. Lee  
*Deputy Director of the United States Patent and Trademark Office*